US012030329B2

(12) United States Patent
Kobayashi

(10) Patent No.: US 12,030,329 B2
(45) Date of Patent: Jul. 9, 2024

(54) THERMAL TRANSFER SHEET

(71) Applicant: Dai Nippon Printing Co., Ltd., Tokyo (JP)

(72) Inventor: Yoshimasa Kobayashi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 153 days.

(21) Appl. No.: 17/593,086

(22) PCT Filed: Mar. 25, 2020

(86) PCT No.: PCT/JP2020/013373
§ 371 (c)(1),
(2) Date: Sep. 9, 2021

(87) PCT Pub. No.: WO2020/203564
PCT Pub. Date: Oct. 8, 2020

(65) Prior Publication Data

US 2022/0184987 A1 Jun. 16, 2022

(30) Foreign Application Priority Data

Mar. 29, 2019 (JP) ................................ 2019-066840

(51) Int. Cl.
*B41M 5/44* (2006.01)
*B41M 5/395* (2006.01)

(52) U.S. Cl.
CPC .............. *B41M 5/44* (2013.01); *B41M 5/395* (2013.01); *B41M 2205/38* (2013.01)

(58) Field of Classification Search
CPC ..... B41M 5/44; B41M 5/395; B41M 2205/38
USPC ........................................................ 428/32.5
See application file for complete search history.

(56) References Cited

U.S. PATENT DOCUMENTS

2015/0258834 A1* 9/2015 Yabe ..................... B32B 27/306
106/162.72
2016/0221376 A1* 8/2016 Yabe ..................... B32B 27/302
2019/0001621 A1* 1/2019 Oota ........................ B41M 5/42
2022/0184987 A1* 6/2022 Kobayashi ............... B41M 5/44

FOREIGN PATENT DOCUMENTS

JP 2007-176011 A 7/2007
JP 2009-137020 A 6/2009
JP 2011-020351 A 2/2011
JP 2017-109323 A 6/2017

OTHER PUBLICATIONS

Process Film, J 2017065115A (Year: 2017).*
JP 2009137020 A1, Hirota Kenichi (Year: 2007).*
International Search Report and Written Opinion (Application No. PCT/JP2020/013373) dated Jun. 23, 2020.

* cited by examiner

*Primary Examiner* — Betelhem Shewareged
(74) *Attorney, Agent, or Firm* — BURR PATENT LAW, PLLC

(57) ABSTRACT

Provided is a thermal transfer sheet having a good foil holding property of a transfer layer and a good foil cutting property of the transfer layer.
A thermal transfer sheet which comprises a substrate 1, a release layer 2, and a transfer layer 10 which are layered in this order, wherein the interval between the release layer 2 and the transfer layer 10 corresponds to the transfer interface of the transfer layer 10, and the release layer 2 contains an acid-modified polyolefin.

9 Claims, 2 Drawing Sheets

THERMAL TRANSFER SHEET

TECHNICAL FIELD

The present disclosure relates to a thermal transfer sheet.

BACKGROUND ART

There are known various forms of a thermal transfer sheet for transferring a transfer layer onto a transfer receiving article. There are known, for example, (i) a thermal transfer sheet in which a transfer layer having a single-layer structure or layered structure including a protective layer is provided on one face of a substrate, (ii) a thermal transfer sheet in which a transfer layer having a single-layer structure or layered structure including a receiving layer is provided on one face of a substrate, and (iii) a thermal transfer sheet in which a transfer layer having a single-layer structure or layered structure including a fusible layer is provided on one face of a substrate. The thermal transfer sheet (i) may be referred to as a protective layer transfer sheet. The thermal transfer sheet (ii) may be referred to as an intermediate transfer medium. The transfer layer of each of these thermal transfer sheets is transferred onto a transfer receiving article by superposing the transfer receiving article and the thermal transfer sheet and heating the other face of the substrate by a heating device. Patent Literature 1 suggests a thermal transfer sheet and the like in which a release layer is provided between the substrate and the transfer layer.

A thermal transfer sheet having a transfer layer is required to have a good foil cutting property on transferring the transfer layer and a good foil holding property of the transfer layer.

CITATION LIST

Patent Literature

Patent Literature 1: Japanese Patent Laid-Open No. 2007-176011

SUMMARY OF INVENTION

Technical Problem

The present disclosure aims principally to provide a thermal transfer sheet having a good foil cutting property of a transfer layer and a good foil holding property of the transfer layer.

Solution to Problem

A thermal transfer sheet according to an embodiment of the present disclosure is a thermal transfer sheet which comprises a substrate, a release layer, and a transfer layer which are layered in this order, wherein the interval between the release layer and the transfer layer corresponds to the transfer interface of the transfer layer, and the release layer contains an acid-modified polyolefin.

Advantageous Effect of Invention

A thermal transfer sheet according to an embodiment of the present disclosure has a good foil cutting property of a transfer layer and a good foil holding property of the transfer layer.

DESCRIPTION OF EMBODIMENTS

Figure 1A:
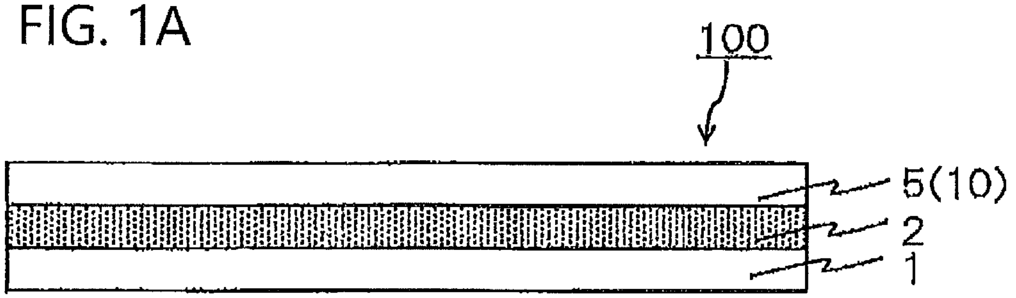
FIG. 1A is a schematic cross-sectional view showing an exemplary thermal transfer sheet of the present disclosure.

Hereinafter, embodiments of the present disclosure will be described with reference to the drawings and the like. The present disclosure may be embodied in many different aspects and should not be construed as being limited to the description of the exemplary embodiments below. In the drawings, components may be shown schematically regarding the width, thickness, shape and the like, compared with actual aspects, for the sake of clearer illustration. The schematic drawings are merely examples and do not limit the interpretations of the present disclosure in any way. In the specification of the present application and the drawings, components that have substantially the same functions as those described before with reference to previous drawings bear the identical reference signs thereto, and detailed descriptions thereof may be omitted. For convenience of explanation, the term such as upward or downward is used to explain, but the upward and downward directions may be reversed. The same applies to the right and left directions.

Thermal Transfer Sheet

Hereinafter, a thermal transfer sheet according to an embodiment of the present disclosure (hereinafter, referred to as the thermal transfer sheet of the present disclosure) will be described.

As shown in FIGS. 1 to 4, a thermal transfer sheet 100 of the present disclosure has a substrate 1, a release layer 2 provided on the substrate 1, and a transfer layer 10 provided on the release layer 2. FIGS. 1 to 4 are schematic cross-sectional views each showing an example of the thermal transfer sheet 100 of the present disclosure.

Substrate

The substrate 1 constituting the thermal transfer sheet 100 of the present disclosure retains the release layer 2 provided on the substrate 1 and the transfer layer 10 provided on the release layer 2.

Examples of the substrate include various films, various sheets, and various cards.

There is no limitation on the material of the substrate 1, and examples thereof may include polyesters such as polyethylene terephthalate, polyarylate, polycarbonate, polyurethane, polyimides, polyetherimides, cellulose derivatives, polyethylene, ethylene-vinyl acetate copolymers, polypropylene, polystyrene, acryl, polyvinyl chloride, polyvinylidene chloride, polyvinyl alcohol, polyvinyl butyral, nylon, polyether ether ketone, polysulfone, polyethersulfone, tetrafluoroethylene-perfluoroalkyl vinyl ether copolymers, polyvinyl fluoride, tetrafluoroethylene-ethylene copolymers, tetrafluoroethylene-hexafluoropropylene copolymers, polychlorotrifluoroethylene, and polyvinylidene fluoride.

One or both of the faces of the substrate 1 may be surface-treated. In an exemplary substrate 1, the face on the release layer 2 side is surface-treated. Examples of a method for surface treatment may include corona discharge treatment, flame treatment, ozone treatment, ultraviolet treatment, radiation treatment, roughening treatment, chemical treatment, plasma treatment, low-temperature treatment, primer treatment, and grafting treatment. The surface treatment includes a treatment layer for treating the surface of the substrate 1. For example, primer treatment includes providing a primer layer.

As the substrate 1, a substrate 1 including a void layer may be used. A substrate including a void layer can be suitably used in the case where the transfer layer 10 of the thermal transfer sheet 100 of the present disclosure has a single-layer structure or layered structure including a receiving layer. The substrate 1 having a void layer can lead to formation of an image having a high density in the receiving layer.

Examples of the void layer may include a substrate having voids therein. Examples of the void layer may include a void layer produced by kneading inorganic particles into a polymer and generating voids each around an inorganic particle as a core while the mixture is stretched, and a void layer produced by mixing an incompatible polymer into a main component resin and generating voids while the mixture is stretched. One polymer or a plurality of polymers may be used. Voids possessed by the void layer may be referred to as microvoids or pores.

There is no limitation on the thickness of the substrate 1, and the thickness is usually 2.5 μm or more and 100 μm or less.

Release Layer

As shown in each figure, the release layer 2 is provided on the substrate 1. The substrate 1 may be in contact with the release layer 2, or the substrate 1 may not be in contact with the release layer 2. In the aspect shown in each figure, the substrate 1 is in a direct contact with the release layer 2. In an exemplary thermal transfer sheet of the present disclosure, one layer or a plurality of layers are located between the substrate 1 and the release layer 2. The transfer layer 10 is provided on the release layer 2. In the thermal transfer sheet of the present disclosure, the release layer 2 is in a direct contact with the transfer layer 10.

The release layer 2 is a layer that remains on the substrate 1 side when the transfer layer 10 of the thermal transfer sheet 100 of the present disclosure is transferred.

The thermal transfer sheet having a transfer layer is required to have a good foil cutting property on transferring the transfer layer 10 onto a transfer receiving article and a good foil holding property of the transfer layer 10.

In the thermal transfer sheet 100 of the present disclosure, the release layer 2 contains an acid-modified polyolefin. The release layer 2 may contain one acid-modified polyolefin or contain two or more acid-modified polyolefins.

The thermal transfer sheet 100 of the present disclosure having such a release layer 2 can make the foil cutting property of the transfer layer 10 and the foil holding property of the transfer layer 10 good.

In the present disclosure, the foil cutting property of the transfer layer means the degree of suppression of tailing when the transfer layer is transferred onto a transfer receiving article. A case where the foil cutting property is good means that tailing can be suppressed.

In the present disclosure, tailing means a phenomenon in which, when the transfer layer is transferred onto a transfer receiving article, the transfer layer is transferred so as to protrude to a non-transfer region side from a boundary between a transfer region and the non-transfer region of the transfer layer as a start point.

In the present disclosure, the foil holding property means the degree of suppression of fall-off of the transfer layer when a bending stress is applied on the thermal transfer sheet. A case where the foil holding property is good means that fall-off of the transfer layer can be suppressed when a bending stress is applied on the thermal transfer sheet.

In the release layer 2 of a preferred aspect, the acid-modified polyolefin contained in the release layer 2 has a melting point of 75° C. or more. The release layer 2 of the preferred aspect can make the transferability of the transfer layer 10 good.

In the release layer 2 of the preferred aspect, the weight average molecular weight (Mw) of the acid-modified polyolefin contained in the release layer 2 is 50000 or more. The release layer 2 of the preferred aspect can make the transferability of the transfer layer 10 good.

In the release layer 2 of a more preferred aspect, the acid-modified polyolefin contained in the release layer 2 has a melting point of 75° C. or more and a weight average molecular weight (Mw) of 50000 or more.

In the present disclosure, the melting point means a value measured in accordance with JIS-K-7121 (2012). In the present disclosure, the weight average molecular weight (Mw) means a value in terms of polystyrene, as measured by GPC (gel permeation chromatography) in accordance with JIS-K-7252-1 (2008).

An exemplary release layer 2 contains an acid-modified polyolefin having a melting point of 90° C. or more and 160° C. or less and a weight average molecular weight (Mw) of 50000 or more and 120000 or less.

An exemplary release layer 2 contains an acid-modified polyolefin having a melting point of 100° C. or more and 140° C. or less and a weight average molecular weight (Mw) of 50000 or more and 120000 or less.

An exemplary release layer 2 contains an acid-modified polyolefin having a melting point of 90° C. or more and 160° C. or less and a weight average molecular weight (Mw) of 65000 or more and 85000 or less.

An exemplary release layer 2 contains an acid-modified polyolefin having a melting point of 100° C. or more and 140° C. or less and a weight average molecular weight (Mw) of 65000 or more and 85000 or less.

The release layers 2 of these aspects can make the transferability of the transfer layer better.

Another exemplary release layer 2 contains an acid-modified polyolefin having a melting point of 75° C. or more and less than 90° C. and a weight average molecular weight (Mw) of 50000 or more and less than 65000.

Another exemplary release layer 2 contains an acid-modified polyolefin having a melting point of 75° C. or more and less than 90° C. and a weight average molecular weight (Mw) of more than 85000 and 120000 or less.

The release layer 2 of this aspect can make the foil holding property of the transfer layer and the foil cutting property of the transfer layer better.

There is no limitation on the acid-modified polyolefin, and examples thereof may include polyolefins modified with an unsaturated carboxylic acid or an anhydride thereof.

There is no limitation on modified forms, and examples thereof may include graft-modified forms.

Examples of a carboxylic acid and an anhydride thereof may include maleic acid, maleic anhydride, acrylic acid, methacrylic acid, itaconic acid, itaconic anhydride, fumaric acid, and crotonic acid.

Examples of a polyolefin component constituting the acid-modified polyolefin may include alkenes having 2 or more and 4 or less carbon atoms.

Examples of the alkenes having 2 or more and 4 or less carbon atoms may include ethylene, propylene, 1-butene, 2-butene, 1-pentene, and 1-hexene. Among these polyolefin components, propylene is preferred. The polyolefin component may be a cyclic polyolefin.

The acid-modified polyolefin also may be an acid-modified polyolefin crosslinked by a crosslinking agent. The release layer 2 of this aspect can make the foil holding property of the transfer layer 10 and the foil cutting property of the transfer layer 10 better.

Examples of the crosslinking agent may include oxazoline compounds, carbodiimide compounds, isocyanate compounds, and epoxy compounds.

When the release layer 2 contains a crosslinking agent, the content of the crosslinking agent is preferably 0.8% by mass or less and more preferably 0.5% by mass or less when the mass of the acid-modified polyolefin is taken as 100% by mass. The release layer 2 of this aspect can suppress an unintended crosslinking reaction between the crosslinking agent contained in the release layer 2 and the components contained in the transfer layer 10.

There is no limitation on the content of the acid-modified polyolefin, and the mass of the acid-modified polyolefin is preferably 60% by mass or more, more preferably 70% by mass or more, and still more preferably 80% by mass or more based on the total mass of the release layer 2.

The amount of acid modification of the acid-modified polyolefin is preferably 1% by mass or more and 5% by mass or less and more preferably 1.4% by mass or more and 5% by mass or less. The release layer 2 of this aspect has good adhesion.

The release layer 2 of this aspect also can make the adhesion between the substrate 1 and the release layer 2 good without providing a layer having an adhesive property between the substrate 1 and the release layer 2. That is, the configuration of the thermal transfer sheet can be simplified. Examples of the layer having an adhesive property may include a primer layer and an anchor layer.

A release layer 2 containing an acid-modified polyolefin having a preferable amount of acid modification is suitable when a substrate containing polyester as the main component is used as the substrate 1, and particularly suitable when a substrate containing polyethylene terephthalate as the main component is used as the substrate 1. A substrate 1 containing polyester as the main component, if it is in a form in which the substrate 1 is in contact with the release layer 2, is a substrate that has difficulty in achieving sufficient adhesion with a conventional release layer. In the present disclosure, the main component means that the mass thereof is more than 50% by mass based on the total mass of the substrate.

An exemplary release layer 2 contains an acid-modified polyolefin and polyvinyl alcohol. The release layer 2 of this aspect can make the transferability of the transfer layer 10 better.

The content of polyvinyl alcohol based on the total mass of the release layer 2 is preferably 1% by mass or more and 50% by mass or less and more preferably 10% by mass or more and 30% by mass or less. The release layer 2 of this aspect can make the foil holding property of the transfer layer 10 and the foil cutting property of the transfer layer 10 better. Providing a transfer layer 10 of a preferred aspect described below on the release layer 2 of this aspect can make all of the transferability of the transfer layer 10, the foil holding property of the transfer layer 10, and the foil cutting property of the transfer layer 10 better.

The release layer 2 may contain components other than the components exemplified above. Examples of other components may include waxes, a silicone wax, a silicone resin, various silicone-modified resins such as a silicone-modified acrylic resin, a fluorine resin, a fluorine-modified resin, an acrylic resin, a thermally crosslinkable epoxy-amino resin, a thermally crosslinkable alkyd-amino resin, a melamine resin, a cellulose resin, and an urea resin. The release layer 2 may contain a component other than these.

There is no limitation on a method for forming the release layer 2, and the release layer 2 may be formed by dissolving or dispersing an acid-modified polyolefin and the like in an appropriate solvent to prepare a coating liquid for the release layer, applying this coating liquid on the substrate 1, and drying the coating liquid. There is no limitation on the method for applying the coating liquid for the release layer, and any conventionally known coating method can be appropriately selected and used.

Examples of the coating method may include a gravure printing method, a screen printing method, and a reverse-coating method using a gravure plate. Coating methods other than these methods also may be used. The same applies to methods for forming various layers described below.

The thickness of the release layer 2 is preferably 0.1 μm or more and 1 μm or less.

Transfer Layer

Figure 1B:
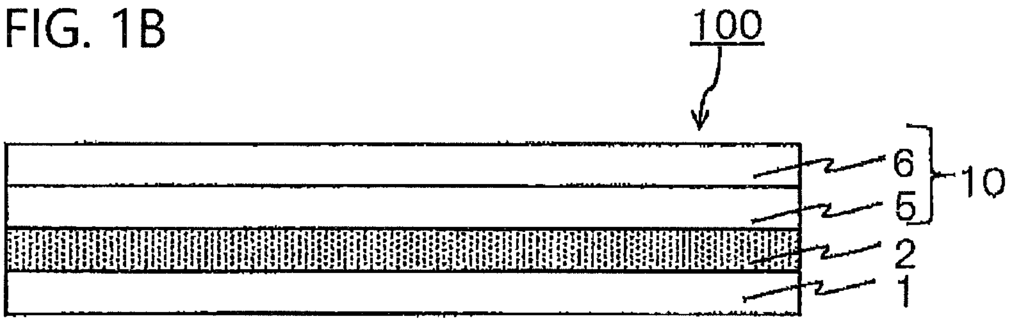
FIG. 1B is a schematic cross-sectional view showing an exemplary thermal transfer sheet of the present disclosure.
Figure 2:
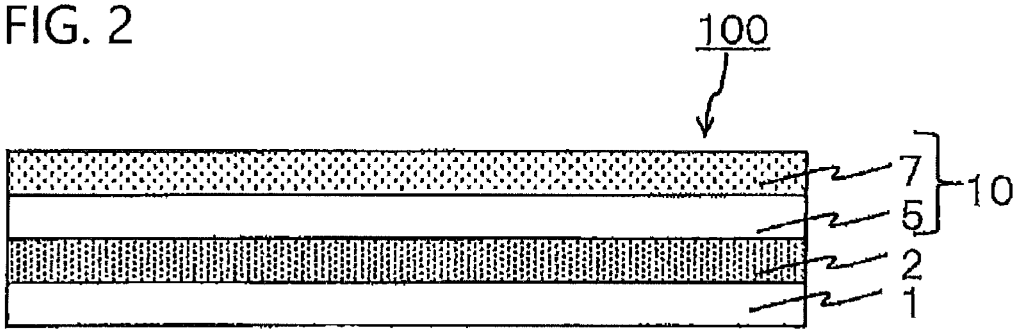
FIG. 2 is a schematic cross-sectional view showing an exemplary thermal transfer sheet of the present disclosure.
Figure 3:
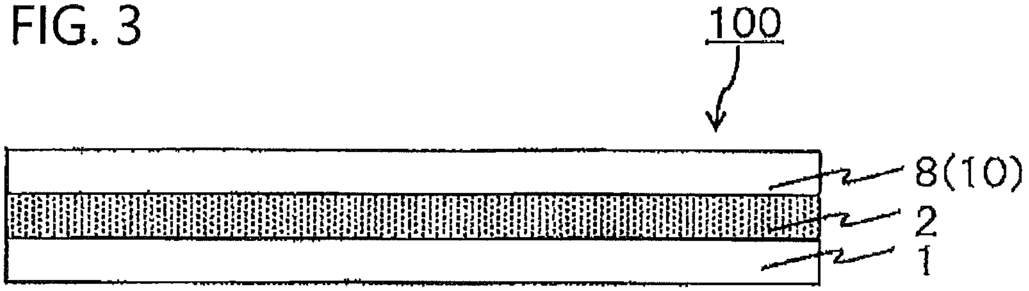
FIG. 3 is a schematic cross-sectional view showing an exemplary thermal transfer sheet of the present disclosure.
Figure 4:
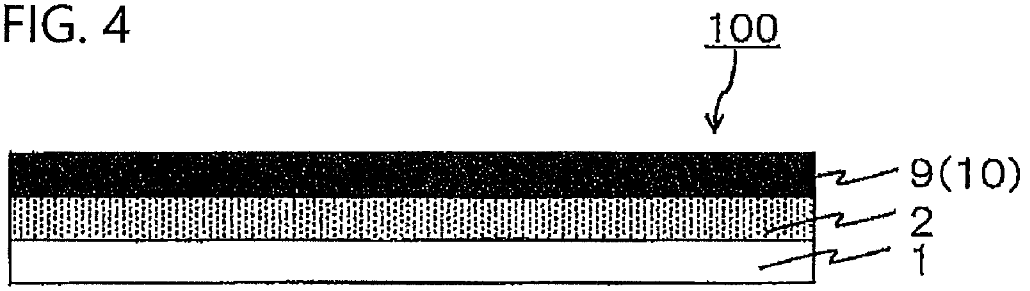
FIG. 4 is a schematic cross-sectional view showing an exemplary thermal transfer sheet of the present disclosure.

As shown in each figure, the transfer layer 10 is provided on the release layer 2. The transfer layer 10 can be released from the release layer 2. In the thermal transfer sheet 100 of the present disclosure, the interval between the release layer 2 and the transfer layer 10 corresponds to the transfer interface of the transfer layer 10. The transfer interface may be referred to as a release interface. The thermal transfer sheet 100 of the present disclosure enables the transfer layer 10 to be transferred at the transfer interface. As shown in FIGS. 1A, 3, and 4, the transfer layer 10 may have a single-layer structure. As shown in FIGS. 1B and 2, the transfer layer 10 may have a layered structure including a plurality of layers layered.

In an exemplary thermal transfer sheet 100 of the present disclosure, the transfer layer 10 has a single-layer structure or layered structure including a protective layer 5. FIGS. 1A and 1B each are a schematic cross-sectional view showing an exemplary thermal transfer sheet of the present disclosure. The transfer layer 10 of an aspect shown in FIG. 1A has a single-layer structure composed only of the protective layer 5. The transfer layer 10 of an aspect shown in FIG. 1B has a layered structure of the protective layer 5 and an adhesion layer 6 which are layered in this order from the release layer 2 side. The protective layer 5 may be referred to as an exfoliate layer. The transfer layer 10 having the layered structure including the protective layer 5 may include other layers than this. The thermal transfer sheet of the aspect in which the transfer layer 10 includes the protective layer 5 functions as a protective layer transfer sheet. The thermal transfer sheet of this aspect can protect a transfer receiving article by transferring the transfer layer 10 onto the transfer receiving article. Examples of the transfer receiving article may include a transfer receiving article having an image.

In an exemplary thermal transfer sheet 100 of the present disclosure, the transfer layer 10 has a layered structure of the protective layer 5 and a receiving layer 7 which are layered in this order from the release layer 2 side. FIG. 2 is a schematic cross-sectional view showing an exemplary thermal transfer sheet of the present disclosure. The transfer layer 10 of an aspect shown in FIG. 2 has a layered structure of the protective layer 5 and the receiving layer 7 which are layered in this order from the release layer 2 side. When the transfer layer 10 has a layered structure including the receiving layer 7, the receiving layer 7 is located on the surface of the transfer layer 10.

In an exemplary thermal transfer sheet 100 of the present disclosure, the transfer layer 10 has a single-layer structure composed only of the receiving layer 7.

The thermal transfer sheet of this aspect functions as an intermediate transfer medium. With the thermal transfer sheet 100 of this aspect, a print can be produced by forming a thermal transferred image on the receiving layer 7 located on the surface of the transfer layer 10, and then, transferring the transfer layer 10 onto a transfer receiving article.

In an exemplary thermal transfer sheet 100 of the present disclosure, the transfer layer 10 has a single-layer structure or layered structure including a heat seal layer 8. FIG. 3 is a schematic cross-sectional view showing an exemplary thermal transfer sheet of the present disclosure. The transfer layer 10 of an aspect shown in FIG. 3 has a single-layer structure composed only of the heat seal layer 8. The thermal transfer sheet 100 of this aspect, by transferring the transfer layer 10 onto a transfer receiving article, can impart an adhesive property to the transfer receiving article.

The thermal transfer sheet of this aspect functions as a heat seal panel. Examples of a transfer receiving article onto which the transfer layer of this aspect is to be transferred may include an intermediate transfer medium in which an image has been formed on the receiving layer and a protective layer transfer sheet.

For example, by combining the thermal transfer sheet 100 of the aspect shown in FIG. 1A, 2, or 4 with the thermal transfer sheet 100 of the aspect shown in FIG. 3 and transferring the transfer layer 10 of the thermal transfer sheet of the aspect shown in FIG. 3 onto the transfer layer 10 of the thermal transfer sheet 100 of the aspect shown in FIG. 1A, 2, or 4, an adhesive property can be imparted to the transfer layer 10 of the thermal transfer sheet 100 of the aspect shown in FIG. 1A, 2, or 4.

When the transfer layer 10 has a layered structure including the heat seal layer 8, among layers constituting the transfer layer 10, the heat seal layer 8 is located closest to the release layer 2.

In an exemplary thermal transfer sheet 100 of the present disclosure, the transfer layer 10 has a single-layer structure or layered structure including a fusible ink layer 9. FIG. 4 is a schematic cross-sectional view showing an exemplary thermal transfer sheet of the present disclosure. The transfer layer 10 of an aspect shown in FIG. 4 has a single-layer structure composed only of the fusible ink layer 9.

The thermal transfer sheet 100 of the present disclosure is not limited to the applications described above and can be applied to applications other than these. For example, when the transfer layer 10 includes the receiving layer 7 and the receiving layer 7 is in contact with the release layer 2, it is possible to produce a thermal transfer image-receiving sheet on the surface of which the receiving layer 7 is located by transferring the transfer layer 10 onto a transfer receiving article. An exemplary transfer layer 10 has a layered structure of the receiving layer 7 and the adhesion layer 6 which are layered in this order from the release layer 2 side.

As the constituents that constitute the transfer layer 10 of various aspects described above, that is, the protective layer 5, the adhesion layer 6, the receiving layer 7, the heat seal layer 8, and the fusible ink layer 9, those conventionally known in the field of thermal transfer sheet may be appropriately selected and used.

Examples of the component of the protective layer 5 may include acrylic resins, polyesters, polycarbonate, vinyl resins such as vinyl chloride-vinyl acetate copolymers, ultraviolet absorbing resins, epoxy resins, polystyrene, polyurethane, urethane-modified acryl, acryl-modified urethane, silicone-modified resins thereof, mixtures of these resins, ionizing radiation curable resins, and ultraviolet curable resins.

Examples of the component of the adhesion layer 6 may include acrylic resins, polyurethane, polyolefins, polyesters, epoxy resins, urea resins, melamine resins, phenol resins, vinyl resins such as vinyl acetate and vinyl chloride-vinyl acetate copolymers, and cyano acrylate. The same applies to the component of the heat seal layer 8.

Examples of the component of the receiving layer 7 may include acrylic resins, polyolefins, polyvinyl acetate, vinyl chloride-vinyl acetate copolymers, ethylene-vinyl acetate copolymers, polyesters, polystyrene, polyamides, copolymers of an olefin and another vinyl polymer, ionomers, cellulose resins, polycarbonate, polyvinyl pyrrolidone, polyvinyl alcohol, and gelatin.

Examples of olefin components may include ethylene and propylene.

Examples of the component of the fusible ink layer 9 may include coloring agents.

Examples of components of the coloring agents may include dyes, organic coloring pigments, fluorescent pigments, titanium oxide, zinc oxide, carbon black, iron oxide, yellow iron oxide, ultramarine blue, hologram powder, aluminum powder, metallic pigments, and pearl pigments.

The transfer layer 10 including the fusible ink layer 9 can impart various designability to a transfer receiving article onto which the transfer layer has been transferred.

The transfer layer 10 including the fusible ink layer 9 can form an image on a transfer receiving article in accordance with the hue of the coloring agent contained in the fusible ink layer 9.

A fusible ink layer 9 containing a metallic pigment, a pearl pigment, or the like functions as a gloss layer. A transfer layer including the fusible ink layer 9 of this aspect has a gloss feel.

A fusible ink layer 9 containing titanium oxide, carbon black, or the like functions as an underlying layer or a concealing layer.

The fusible ink layer 9 may contain two or more coloring agents.

An exemplary fusible ink layer 9 contains both a coloring agent that can develop the function of a gloss layer and a coloring agent that can develop the function of an underlying layer or a concealing layer.

The fusible ink layer 9 may contain a binder resin, a wax, and the like.

In an exemplary transfer layer 10, any one or two or more layers constituting the transfer layer 10 contain a coloring agent.

An exemplary transfer layer 10 includes a protective layer 5 containing a coloring agent.

An exemplary transfer layer 10 includes an adhesion layer 6 containing a coloring agent.

An exemplary transfer layer 10 includes a heat seal layer 8 containing a coloring agent.

In a transfer layer 10 of a preferred aspect, the layer in contact with the release layer 2 contains a resin having an acid value of 20 mgKOH/g or less. In a transfer layer 10 of a more preferred aspect, the layer in contact with the release layer 2 contains a resin having an acid value of 15 mgKOH/g or less. In the present disclosure, the layer in contact with the release layer 2 means a layer in a direct contact with the release layer 2, among the layers constituting the transfer layer. The transfer layer 10 of this aspect can make the transferability of the transfer layer 10 better.

In a transfer layer 10 of a still more preferred aspect, the layer in contact with the release layer 2 contains a resin having an acid value of 3 mgKOH/g or more and 15 mgKOH/g or less. In a transfer layer 10 of a particularly preferred aspect, the layer in contact with the release layer 2 contains a resin having an acid value of 6 mgKOH/g or more and 15 mgKOH/g or less. The transfer layer 10 of this aspect can make the transferability of the transfer layer 10 good and make the foil cutting property of the transfer layer 10 and the foil holding property of the transfer layer 10 better.

In an exemplary transfer layer 10, the layer in contact with the release layer 2 is a protective layer 5.

In an exemplary transfer layer 10, the layer in contact with the release layer 2 is a heat seal layer 8.

In an exemplary transfer layer 10, the layer in contact with the release layer 2 is a receiving layer 7.

In an exemplary transfer layer 10, the layer in contact with the release layer 2 is a fusible ink layer 9.

In the present disclosure, the acid value means the number of milligrams of potassium hydroxide necessary for neutralizing the acid component (e.g., carboxyl group) contained in 1 g of a polymer. The acid value can be measured by a method in accordance with JIS-K-2501 (2003).

As a resin having an acid value of 20 mgKOH/g or less, an acrylic resin, a vinyl chloride-vinyl acetate copolymer, and polyester are preferable.

The content of the resin having an acid value of 20 mgKOH/g or less is preferably 50% by mass or more and more preferably 70% by mass or more based on the total mass of the layer in contact with the release layer 2.

The thickness of the layer containing the resin having an acid value of 20 mgKOH/g or less is preferably 0.1 μm or more and 10 μm or less.

In the thermal transfer sheet 100 of a preferred aspect of the present disclosure, the release layer 2 contains polyvinyl alcohol, or the layer in contact with the release layer 2 contains a resin having an acid value of 20 mgKOH/g or less.

In the thermal transfer sheet 100 of a preferred aspect of the present disclosure, the release layer 2 contains polyvinyl alcohol, and the layer in contact with the release layer 2 contains a resin having an acid value of 20 mgKOH/g or less.

Back Face Layer

A back face layer (not shown) may be provided on the face on the opposite side of the face of the substrate 1 on which the release layer 2 is provided. The thickness of the back face layer is preferably 0.1 μm or more and 5 μm or less and more preferably 0.3 μm or more and 2 μm or less.

Transfer Receiving Article

Examples of a transfer receiving article onto which the transfer layer 10 of the thermal transfer sheet 100 of the present disclosure is to be transferred may include paper substrates, resin substrates, wood, glass substrates, metal substrates, and ceramic substrates. When the thermal transfer sheets of various aspects of the present disclosure are used in combination, any one of the thermal transfer sheets 100 may be used as a transfer receiving article.

Examples of the resin substrate may include forms such as films and cards. The whole or a portion of a transfer receiving article may have a curvature, an uneven structure, or the like. The transfer receiving article may have a predetermined image formed thereon.

Examples of the paper substrate may include plain paper, wood-free paper, and tracing paper.

Examples of the resin substrate may include polycarbonate, acrylic resins, acrylonitrile-butadiene-styrene (ABS) resins, and polyvinyl chloride.

Examples of a metal substrate include aluminum.

Example of a ceramic substrate include pottery.

Method for Producing Print

A method for producing a print of the present disclosure includes an image forming step, a first transfer step, and a second transfer step.

In the method for producing a print of the present disclosure, an intermediate transfer medium, a heat seal panel, and a transfer receiving article are used.

The image forming step is a step of, by use of an intermediate transfer medium and a thermal transfer sheet having a dye layer, forming an image on the receiving layer of the intermediate transfer medium.

The first transfer step is a step of, by use of a heat seal panel, transferring a transfer layer including a heat seal layer onto the intermediate transfer medium after the image formation.

The second transfer step is a step of transferring the transfer layer of the intermediate transfer medium onto a transfer receiving article after the first transfer step. A print can be produced by way of this step.

The print produced has a layered structure of the transfer receiving article, the transfer layer including the heat seal layer, and the transfer layer including the receiving layer on which the image has been formed which are layered in this order.

In the method for producing a print of the present disclosure, the thermal transfer sheet 100 of the present disclosure including the transfer layer having a single-layer structure or layered structure including the receiving layer 7 (see FIG. 2) is used as the intermediate transfer medium.

In the method for producing a print of the present disclosure, the thermal transfer sheet 100 of the present disclosure including the transfer layer 10 having a single-layer structure or layered structure including the heat seal layer 8 (see FIG. 3) is used as the heat seal panel.

In the thermal transfer sheet 100 that functions as the intermediate transfer medium and the thermal transfer sheet 100 that functions the heat seal panel, the various configurations described for the thermal transfer sheet 100 of the present disclosure described above can be appropriately selected and used.

Combination of Thermal Transfer Sheets

A combination of the thermal transfer sheets of the present disclosure is a combination of the thermal transfer sheet 100 of the present disclosure including a transfer layer having a single-layer structure or layered structure including the receiving layer 7 and the thermal transfer sheet 100 of the present disclosure including a transfer layer 10 having a single-layer structure or layered structure including the heat seal layer 8. In the thermal transfer sheets 100 constituting this combination, the various configurations described for the thermal transfer sheet 100 of the present disclosure described above can be appropriately selected and used.

The thermal transfer sheet according to an embodiment of the present disclosure is a thermal transfer sheet which comprises a substrate, a release layer, and a transfer layer which are layered in this order, wherein the interval between the release layer and the transfer layer corresponds to the transfer interface of the transfer layer, and the release layer contains an acid-modified polyolefin. The thermal transfer sheet satisfies one or a plurality of the following (i) to (viii). When the thermal transfer sheet according to the embodiment of the present disclosure satisfies a plurality of the following (i) to (viii), any of the following (i) to (viii) may be combined.

(i) The acid-modified polyolefin has a melting point of 75° C. or more.

(ii) The acid-modified polyolefin has a weight average molecular weight (Mw) of 50000 or more.

(iii) The acid-modified polyolefin has an amount of acid modification of 1.4% by mass or more and 5% by mass or less.

(iv) The transfer layer has a single-layer structure or layered structure, and among the layers constituting the transfer layer, the layer in contact with the release layer contains a resin having an acid value of 20 mgKOH/g or less.

(v) The resin having an acid value of 20 mgKOH/g or less is any of an acrylic resin, a vinyl chloride-vinyl acetate copolymer, and a polyester.

(vi) The substrate is in contact with the release layer, and the substrate contains a polyester.

(vii) The transfer layer has a layered structure of a protective layer and a receiving layer which are layered in this order from the release layer side.

(viii) The transfer layer has a single-layer structure or layered structure including a heat seal layer, and when the transfer layer has a layered structure, the heat seal layer is located at the transfer interface of the transfer layer.

EXAMPLES

Next, the present disclosure will be described more concretely with reference to Examples and Comparative Examples. Hereinafter, unless otherwise specified, the expression of part(s) or % means that by mass. The amount blended (parts) is an amount fed, which is a value not in terms of solid content. The details of acid-modified polyolefins (1) to (5) included in each coating liquid for a release layer are as in Table 1.

TABLE 1

| | Melting point (° C.) | Weight average molecular weight (Mw) | Amount (% by mass) of acid modification | Product name |
|---|---|---|---|---|
| Acid-modified polyolefin (1) | 125 | 75000 | 1.5 | HARDLEN(R) NZ-1022 TOYOBO Co., Ltd., solid content: 30% |
| Acid-modified polyolefin (2) | 80 | 90000 | 1.1 | HARDLEN(R) NZ-1015 TOYOBO Co., Ltd., solid content: 30% |
| Acid-modified polyolefin (3) | 80 | 60000 | 1.2 | HARDLEN(R) EY-4075 TOYOBO Co., Ltd., solid content: 30% |
| Acid-modified polyolefin (4) | 70 | 75000 | 1.5 | HARDLEN(R) NZ-1004 TOYOBO Co., Ltd., solid content: 30% |
| Acid-modified polyolefin (5) | 87 | 45000 | 1.6 | HARDLEN(R) EH-801 TOYOBO Co., Ltd., solid content: 30% |

EXAMPLE 1

A polyethylene terephthalate film having a thickness of 5 μm was used as a substrate. A coating liquid for release layer 1 having the following composition was applied on this substrate, and the coated liquid was dried to form a release layer having a thickness of 0.2 μm. A coating liquid for protective layer 1 having the following composition was applied on the release layer, and the coated liquid was dried to form a protective layer having a thickness of 1 μm. Thus, obtained was a thermal transfer sheet of Example 1, in which the release layer and the protective layer were provided in this order on the substrate. The protective layer constitutes the transfer layer in the present disclosure.

Coating Liquid for Release Layer 1

| | |
|---|---|
| Acid-modified polyolefin (1) | 16 parts |
| Water | 42 parts |
| Isopropyl alcohol | 42 parts |

Coating Liquid for Protective Layer 1

| | |
|---|---|
| Acrylic resin (acid value: 0 mgKOH/g) (DIANAL(R) BR-83, Mitsubishi Chemical Corporation) | 20 parts |
| Methyl ethyl ketone | 40 parts |
| Toluene | 40 parts |

EXAMPLE 2

A thermal transfer sheet of Example 2 was obtained exactly in the same manner as in Example 1 except that the coating liquid for release layer 1 was replaced by a coating liquid for release layer 2 having the following composition to form the release layer having a thickness of 0.2 μm.

Coating Liquid for Release Layer 2

| | |
|---|---|
| Acid-modified polyolefin (2) | 16 parts |
| Water | 42 parts |
| Isopropyl alcohol | 42 parts |

EXAMPLE 3

A thermal transfer sheet of Example 3 was obtained exactly in the same manner as in Example 1 except that the coating liquid for release layer 1 was replaced by a coating liquid for release layer 3 having the following composition to form the release layer having a thickness of 0.2 μm.

Coating Liquid for Release Layer 3

| | |
|---|---|
| Acid-modified polyolefin (3) | 16 parts |
| Water | 42 parts |
| Isopropyl alcohol | 42 parts |

EXAMPLE 4

A thermal transfer sheet of Example 4 was obtained exactly in the same manner as in Example 1 except that the coating liquid for protective layer 1 was replaced by a coating liquid for protective layer 2 having the following composition to form the protective layer having a thickness of 1 μm.

Coating Liquid for Protective Layer 2

| | |
|---|---|
| Acrylic resin (acid value: 9.8 mgKOH/g) (DIANAL(R) BR-87, Mitsubishi Chemical Corporation) | 20 parts |
| Methyl ethyl ketone | 40 parts |
| Toluene | 40 parts |

EXAMPLE 5

A thermal transfer sheet of Example 5 was obtained exactly in the same manner as in Example 1 except that the coating liquid for protective layer 1 was replaced by a coating liquid for protective layer 3 having the following composition to form the protective layer having a thickness of 1 μm.

Coating Liquid for Protective Layer 3

| | |
|---|---|
| Vinyl chloride - vinyl acetate copolymer (acid value: 5.9 mgKOH/g) (SOLBIN(R) M5, Nissin Chemical Industry Co., Ltd.) | 20 parts |
| Methyl ethyl ketone | 40 parts |
| Toluene | 40 parts |

EXAMPLE 6

The coating liquid for protective layer 1 was replaced by a coating liquid for protective layer 4 having the following composition. The coating liquid for protective layer 4 was applied on the release layer, and the coated liquid was dried to form a coated film. Then, a thermal transfer sheet of Example 6 was obtained exactly in the same manner as in Example 1 except that this coated film was irradiated with an electron beam at an acceleration voltage of 165 kV and an irradiation dose of 5 MRad to form a protective layer having a thickness of 4 μm.

Coating Liquid for Protective Layer 4

| | |
|---|---|
| Tetrafunctional polycarbonate acrylate (Mw: 10000) | 95 parts |
| Acrylic polymer (copolymer of methyl methacrylate and methacrylic acid, Tg: 105° C., Mw: about 20000) | 2.5 parts |
| Additive | 2.5 parts |

EXAMPLE 7

The coating liquid for protective layer 1 was replaced by a coating liquid for protective layer 5 having the following composition. The coating liquid for protective layer 5 was applied on the release layer, and the coated liquid was dried to form a coated film. Then, a thermal transfer sheet of Example 7 was obtained exactly in the same manner as in Example 1 except that this coated film was irradiated with ultraviolet rays at an amount of exposure of 220 mJ/cm$^2$ using a UV exposure machine (Fusion UV, F600V, LH10 lamp, H valve, cold-type reflector) to form a protective layer having a thickness of 1 μm.

Coating Liquid for Protective Layer 5

| | |
|---|---|
| Polyfunctional acrylate (NK ester A-9300, Shin-Nakamura Chemical Co., Ltd.) | 20 parts |
| Urethane acrylate (NK oligomer EA1020, Shin-Nakamura Chemical Co., Ltd.) | 20 parts |
| Urethane acrylate (NK ester U-15HA, Shin-Nakamura Chemical Co., Ltd.) | 10 parts |
| Reactive binder (containing an unsaturated group) (NK polymer C24T, Shin-Nakamura Chemical Co., Ltd.) | 5 parts |
| Filler (volume average particle size: 12 nm) (MEK-AC2140Z, Nissan Chemical Industries, Ltd.) | 40 parts |
| Surfactant (acrylic surfactant) (LF-1984, Kusumoto Chemicals, Ltd.) | 0.1 parts |
| Toluene | 200 parts |
| Methyl ethyl ketone | 200 parts |

EXAMPLE 8

A thermal transfer sheet of Example 8 was obtained exactly in the same manner as in Example 1 except that the coating liquid for release layer 1 was replaced by a coating liquid for release layer 4 having the following composition to form the release layer having a thickness of 0.2 μm and the coating liquid for protective layer 1 was replaced by the coating liquid for protective layer 2 having the composition described above to form the protective layer having a thickness of 1 μm.

Coating Liquid for Release Layer 4

| | |
|---|---|
| Acid-modified polyolefin (1) | 13 parts |
| Polyvinyl alcohol (GOHSENOL(R) KH-20, The Nippon Synthetic Chemical Industry Co., Ltd.) | 1 part |
| Water | 43 parts |
| Isopropyl alcohol | 43 parts |

EXAMPLE 9

A thermal transfer sheet of Example 9 was obtained exactly in the same manner as in Example 1 except that the coating liquid for release layer 1 was replaced by a coating liquid for release layer 5 having the following composition to form the release layer having a thickness of 0.2 μm.

Coating Liquid for Release Layer 5

| | |
|---|---|
| Acid-modified polyolefin (1) | 16.6 parts |
| Crosslinking agent (solid content: 40%) (EPOCROS(R) WS-500, Nippon Shokubai Co., Ltd.) | 0.06 parts |
| Water | 42 parts |
| Isopropyl alcohol | 42 parts |

EXAMPLE 10

A thermal transfer sheet of Example 10 was obtained exactly in the same manner as in Example 1 except that the coating liquid for release layer 1 was replaced by the coating liquid for release layer 5 having the composition described above to form the release layer having a thickness of 0.2 μm and the coating liquid for protective layer 1 was replaced by the coating liquid for protective layer 2 having the composition described above to form the protective layer having a thickness of 1 μm.

EXAMPLE 11

A thermal transfer sheet of Example 11 was obtained exactly in the same manner as in Example 1 except that the coating liquid for release layer 1 was replaced by the coating liquid for release layer 4 having the composition described above to form the release layer having a thickness of 0.2 μm and the coating liquid for protective layer 1 was replaced by a coating liquid for protective layer 6 having the following composition to form the protective layer having a thickness of 1 μm.

Coating Liquid for Protective Layer 6

| | |
|---|---|
| Acrylic resin (acid value: 18 mgKOH/g) (DIANAL(R) BR-77, Mitsubishi Chemical Corporation | 20 parts |
| Methyl ethyl ketone | 40 parts |
| Toluene | 40 parts |

EXAMPLE 12

A thermal transfer sheet of Example 12 was obtained exactly in the same manner as in Example 1 except that the coating liquid for release layer 1 was replaced by a coating liquid for release layer 6 having the following composition to form the release layer having a thickness of 0.2 μm and the coating liquid for protective layer 1 was replaced by the coating liquid for protective layer 2 having the composition described above to form the protective layer having a thickness of 1 μm.

Coating Liquid for Release Layer 6

| | |
|---|---|
| Acid-modified polyolefin (1) | 8 parts |
| Polyvinyl alcohol (GOHSENOL(R) KH-20, The Nippon Synthetic Chemical Industry Co., Ltd.) | 2 parts |
| Water | 45 parts |
| Isopropyl alcohol | 45 parts |

EXAMPLE 13

A thermal transfer sheet of Example 13 was obtained exactly in the same manner as in Example 1 except that the coating liquid for release layer 1 was replaced by the coating liquid for release layer 4 having the composition described above to form the release layer having a thickness of 0.2 μm.

EXAMPLE 14

A thermal transfer sheet of Example 14 was obtained exactly in the same manner as in Example 1 except that the coating liquid for protective layer 1 was replaced by the coating liquid for protective layer 6 having the composition described above to form the protective layer having a thickness of 1 μm.

EXAMPLE 15

A thermal transfer sheet of Example 15 was obtained exactly in the same manner as in Example 1 except that the coating liquid for release layer 1 was replaced by the coating liquid for release layer 5 having the composition described above to form the release layer having a thickness of 0.2 μm and the coating liquid for protective layer 1 was replaced by the coating liquid for protective layer 6 having the composition described above to form the protective layer having a thickness of 1 μm.

EXAMPLE 16

A thermal transfer sheet of Example 16 was obtained exactly in the same manner as in Example 1 except that the coating liquid for release layer 1 was replaced by a coating liquid for release layer 7 having the following composition to form the release layer.

Coating Liquid for Release Layer 7

| | |
|---|---|
| Acid-modified polyolefin (4) | 17 parts |
| Water | 36 parts |
| Isopropyl alcohol | 47 parts |

EXAMPLE 17

A thermal transfer sheet of Example 17 was obtained exactly in the same manner as in Example 1 except that the coating liquid for release layer 1 was replaced by a coating liquid for release layer 8 having the following composition to form the release layer having a thickness of 0.2 μm.

Coating Liquid for Release Layer 8

| | |
|---|---|
| Acid-modified polyolefin (5) | 17 parts |
| Water | 36 parts |
| Isopropyl alcohol | 47 parts |

EXAMPLE 18

A thermal transfer sheet of Example 18 was obtained exactly in the same manner as in Example 1 except that the coating liquid for release layer 1 was replaced by the coating liquid for release layer 4 having the composition described above to form the release layer having a thickness of 0.2 μm and the coating liquid for protective layer 1 was replaced by a coating liquid for protective layer 7 having the following composition to form the protective layer having a thickness of 1 μm.

Coating Liquid for Protective Layer 7

| | |
|---|---|
| Polyester (acid value: 1 mgKOH/g) (Elitel(R)3380, Unitika Ltd.) | 20 parts |
| Methyl ethyl ketone | 40 parts |
| Toluene | 40 parts |

Comparative Example 1

A thermal transfer sheet of Comparative Example 1 was obtained exactly in the same manner as in Example 1 except that the coating liquid for release layer 1 was replaced by a coating liquid for release layer A having the following composition to form the release layer having a thickness of 0.2 μm.

Coating Liquid for Release Layer A

| | |
|---|---|
| Silicone-modified resin (solid content: 30%) (KS-847, Shin-Etsu Chemical Co., Ltd.) | 16 parts |
| Methyl ethyl ketone | 42 parts |
| Toluene | 42 parts |

Comparative Example 2

A thermal transfer sheet of Comparative Example 2 was obtained exactly in the same manner as in Example 1 except that the coating liquid for release layer 1 was replaced by a coating liquid for release layer B having the following composition to form the release layer having a thickness of 0.2 μm.

Coating Liquid for Release Layer B

| | |
|---|---|
| Polyurethane (solid content: 22.5%) (HYDRAN(R) AP-40(F), DIC Corporation) | 18 parts |
| Polyvinyl alcohol (GOHSENOL(R) KH-20, The Nippon Synthetic Chemical Industry Co., Ltd.) | 1 part |
| Water | 40.5 parts |
| Isopropyl alcohol | 40.5 parts |

Comparative Example 3

A thermal transfer sheet of Comparative Example 3 was obtained exactly in the same manner as in Example 1 except that no release layer was formed.

Transfer of Transfer Layer

A card laminator (Fujipla) was used to transfer the transfer layer of the thermal transfer sheet of each of the Examples and the Comparative Examples onto a card substrate made of vinyl chloride (Dai Nippon Printing Co., Ltd.) to obtain a transferred material of each of the Examples and the Comparative Examples. Transfer of the transfer layer was conducted under each of the following four conditions (the following transfer conditions 1, 2, 3, and 4).

Transfer Conditions

Transfer conditions 1: 160° C., 20 mm/sec.
Transfer conditions 2: 140° C., 20 mm/sec.
Transfer conditions 3: 120° C., 20 mm/sec.
Transfer conditions 4: 100° C., 20 mm/sec.

Transferability Evaluation

The condition of transfer when the transfer layer was transferred under the transfer conditions described above was checked, and transferability evaluation was conducted based on the following evaluation criteria. The evaluation results are shown in Table 2. Fusion in the following evaluation criteria means fusion between the release layer and the transfer layer.

Evaluation Criteria

A: Transfer was achieved without fusion under all of the transfer conditions 1 to 4.

B: Fusion occurred under the transfer conditions 1, but transfer was achieved without fusion between the release layer and the transfer layer under the transfer conditions 2 to 4.

C: Fusion occurred under the transfer conditions 1 and 2, but transfer was achieved without fusion under the transfer conditions 3 and 4.

D: Fusion occurred under the transfer conditions 1 to 3, but transfer was achieved without fusion under the transfer conditions 4.

Evaluation of Foil Holding

Presence or absence of foil fall of the transfer layer on bending the thermal transfer sheet of each of the Examples and the Comparative Examples was visually checked, and evaluation of foil holding of the transfer layer was conducted based on the following evaluation criteria. The evaluation results are shown in Table 2.

Evaluation Criteria

A: No foil fall of the transfer layer occurs.

B: Slight foil fall of the transfer layer is observed but there is no problem in practical use.

C: Partial foil fall of the transfer layer is observed but there is no problem in practical use.

NG: Foil fall of the transfer layer is observed in the greater part, and there is a concern over the problem in practical use.

Evaluation of Foil Cutting Property

The tailing state of an edge of the transferred material of each of the Examples and the Comparative Examples, obtained in the transfer of the transfer layer described above, was checked, and the foil cutting property was evaluated based on the following evaluation criteria. For the evaluation of the foil cutting property, the transferred material of each of the Examples and the Comparative Examples obtained under the transfer conditions 4 was used. The evaluation results are shown in Table 2.

Evaluation Criteria

A: No tailing occurs.

B: The length of tailing is 0.2 mm or less.

C: The length of tailing is more than 0.2 mm and less than 1 mm.

NG: The length of tailing is 1 mm or more.

Adhesion Evaluation

Tape (Scotch® tape (BK-24), 3M Company) was stuck onto the transfer layer of thermal transfer sheet of each of the Examples and the Comparative Examples, and the condition when the tape was released at a release angle of 90° was checked. Then, adhesion evaluation was conducted based on the following evaluation criteria. The evaluation results are also shown in Table 2.

Evaluation Criteria

A: The release layer is not released from the substrate.

B: A portion of the release layer is released from the substrate.

C: The release layer is entirely released from the substrate.

TABLE 2

| | Transfer-ability | Foil holding property | Foil cutting property | Adhesion |
|---|---|---|---|---|
| Example 1 | B | C | C | B |
| Example 2 | C | B | A | C |
| Example 3 | C | B | A | C |
| Example 4 | B | A | B | B |
| Example 5 | B | B | B | B |
| Example 6 | B | C | C | A |
| Example 7 | B | C | C | A |
| Example 8 | A | A | B | B |
| Example 9 | B | B | B | A |
| Example 10 | B | A | A | A |
| Example 11 | B | A | A | B |
| Example 12 | A | C | C | C |
| Example 13 | A | C | C | B |
| Example 14 | C | A | A | B |
| Example 15 | C | A | A | B |
| Example 16 | D | B | B | B |
| Example 17 | D | B | B | B |
| Example 18 | B | B | B | B |
| Comparative Example 1 | A | NG | NG | B |
| Comparative Example 2 | B | NG | NG | C |
| Comparative Example 3 | B | NG | NG | C |

REFERENCE SIGNS LIST

1 Substrate
2 Release layer
5 Protective layer
6 Adhesive layer
7 Receiving layer
8 Heat seal layer
9 Fusible ink layer
10 Transfer layer
100 Thermal transfer sheet

The invention claimed is:

1. A thermal transfer sheet which comprises a substrate, a release layer, and a transfer layer which are layered in this order, wherein the interval between the release layer and the transfer layer corresponds to a transfer interface of the transfer layer, wherein the release layer consists of a composition containing an acid-modified polyolefin and a crosslinking agent, wherein the release layer contains a crosslinked material in which the acid-modified polyolefin is crosslinked by the crosslinking agent, wherein the composition contains a content of the crosslinking agent is 0.5% by mass or less when a mass of the acid-modified polyolefin is taken as 100% by mass, wherein the transfer layer has a single-layer structure or layered structures, and wherein, among the layers constituting the transfer layer, a layer in contact with the release layer contains a resin having an acid value of 6 mgKOH/g or more and 15 mgKOH/g or less.

2. The thermal transfer sheet according to claim 1, wherein the acid-modified polyolefin has a melting point of 75° C. or more.

3. The thermal transfer sheet according to claim 1, wherein the acid-modified polyolefin has a weight average molecular weight (Mw) of 50000 or more.

4. The thermal transfer sheet according to claim 1, wherein the acid-modified polyolefin has an amount of acid modification of 1.4% by mass or more and 5% by mass or less.

5. The thermal transfer sheet according to claim 1, wherein the resin having the acid value of 6 mgKOH/g or more and 15 mgKOH/g or less is at least one of an acrylic resin, a vinyl chloride-vinyl acetate copolymer, and a polyester.

6. The thermal transfer sheet according to claim 1, wherein the substrate is in contact with the release layer, and wherein the substrate contains a polyester.

7. The thermal transfer sheet according to claim 1, wherein the transfer layer includes a receiving layer, and wherein when the transfer layer has a layered structure, the receiving layer is located at the surface of the transfer layer.

8. The thermal transfer sheet according to claim 7, wherein the transfer layer has a layered structure of a protective layer and the receiving layer which are layered in this order from the release layer side.

9. The thermal transfer sheet according to claim 1, wherein the transfer layer includes a heat seal layer, and wherein when the transfer layer has a layered structure, the heat seal layer is located at the transfer interface of the transfer layer.

* * * * *